INVENTORS.
Marshall P. Neipert
Robert D. Blue
Ralph M. Hunter
BY Griswold & Burdick
ATTORNEYS United States Patent Office 2,949,412
Patented Aug. 16, 1960

2,949,412

MERCURY-CELL ELECTROLYSIS OF SODIUM CHLORIDE BRINE

Marshall P. Neipert, Robert D. Blue, and Ralph M. Hunter, Midland, Mich., assignors to The Dow Chemical Company, Midland, Mich., a corporation of Delaware Filed Nov. 24, 1948, Ser. No. 61,822

5 Claims. (Cl. 204—99)

This invention relates to improvements in electrolyzing sodium chloride brine in mercury-cathode cells and particularly concerns the chemical composition of the brine circulated through such cells.

In operating mercury-cathode electrolytic brine cells for making chlorine and caustic soda, an ever-present problem is to minimize the amount of hydrogen deposited on the mercury cathode simultaneously with the sodium. This hydrogen mixes with the gaseous chlorine formed in the cell and, if its concentration nears 5 percent, creates an explosion hazard. Good practice calls for a hydrogen concentration well under one percent.

It has long been realized that hydrogen deposition is associated with the presence of impurities in the feed brine. Consequently, it has been customary to purify the brine as completely as possible by chemical treatment and then to store and feed it to the cells under slightly alkaline conditions to prevent pickup of impurities from contact with metals during handling. More recently it has been appreciated that not all impurities need be removed and that calcium sulfate may be present up to its limit of solubility in alkaline feed brine without causing serious hydrogen deposition provided both magnesium and iron are rigorously excluded. This process, while it avoids removing the calcium sulfate usually present in brine made from raw sodium chloride, is very troublesome to carry out because of the difficulty in excluding the iron impurity to below its tolerance limit, 0.1 part per million.

It is therefore a principal object of the present invention to provide a brine treatment for minimizing hydrogen evolution in a mercury-cathode cell which, in addition to avoiding the step of removing calcium sulfate from the brine, allows so much higher an iron tolerance that operational difficulties due to iron impurity are not encountered. Another object is to provide a process for electrolyzing sodium chloride brine in which the rate of formation of chlorate impurity in the anolyte and the rate of wear of the graphite anodes in the cell are at a minimum.

The invention is based on the discovery that, in the mercury-cathode electrolysis of strong sodium chloride brine containing calcium sulfate, hydrogen deposition may be minimized without complete exclusion of iron provided both the pH value and the calcium sulfate concentration of the brine are controlled within definite interrelated limits. It is also based on the finding that, by operating the cell with a feed brine which is initially acid, there is a greater stability against upset by transitory occurrences which might otherwise cause excessive hydrogen deposition and there is also less chlorate impurity formed than is ordinarily the case.

The invention may be explained in detail with reference to the accompanying drawings in which.

In the electrolysis of strong sodium chloride brine containing a substantial proportion of calcium sulfate in a mercury-cathode cell, excessive deposition of hydrogen may be prevented, according to the invention, by acidifying the brine entering the cell to a pH value between about 1.5 and about 6 while simultaneously maintaining the concentration of calcium sulfate below about 4 grams per liter. Under these conditions, the hydrogen content of the chlorine produced in the cell rarely if ever exceeds 1.0 to 1.5 percent.

The desired pH value may be maintained by adding virtually any strong acid to the brine, since all such acids react with the sodium chloride present to generate hydrogen chloride in solution. Addition of acid is conveniently made just before the brine enters the electrolytic cell. As a practical matter, however, acids other than hydrochloric or sulfuric are expensive and have the disadvantage of adding foreign anions to the brine. Dilute hydrochloric acid is ordinarily used since it is readily available at most electrolytic chlorine plants, only small quantities being required. The preferred pH range of the feed brine is from 2 to 4.5, with 3.5 to 4.5 being perhaps an optimum.

The concentration of calcium sulfate in the feed brine may be held below 4 grams per liter by any desired method; several ways of removing it are known to the art. The most effective way of limiting its concentration is to maintain sodium sulfate dissolved in the brine in a proportion sufficient to depress the solubility of calcium sulfate to below 4 grams per liter. In this way, even though the brine be saturated with calcium sulfate, the permissible concentration is not exceeded. However, the proportion of sodium sulfate should not be so high as to produce a total sulfate ion concentration over about 10 grams per liter, to avoid excessive attack on the graphite anodes of the cell. It is most satisfactory to repress the solubility of calcium sulfate to not over 3 grams per liter, for which purpose a sodium sulfate concentration of at least 5 to 8 grams per liter is required. Over 10 grams per liter of sodium sulfate should be avoided.

Figure 1:
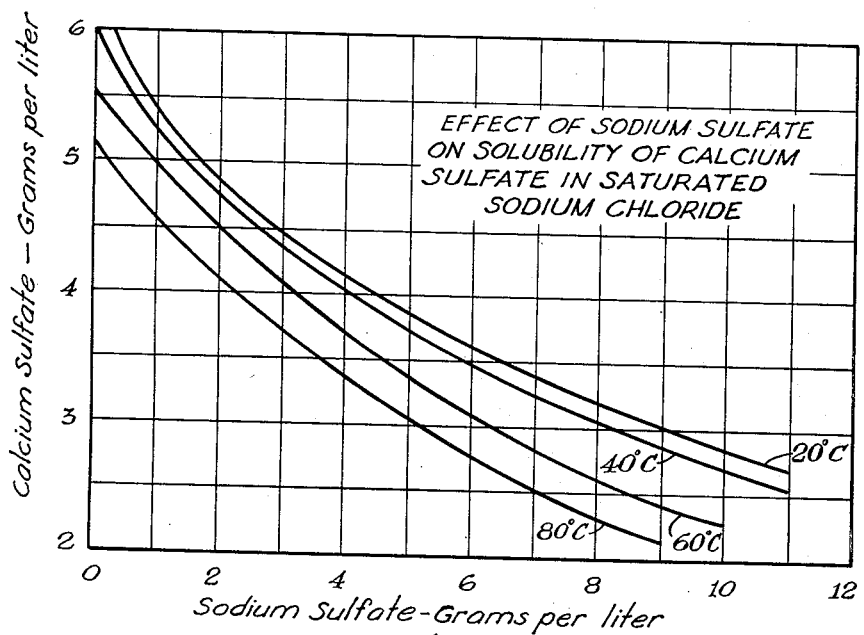
Fig. 1 is a graph showing at several temperatures the solubility limit of calcium sulfate in saturated solutions of sodium chloride containing various proportions of sodium sulfate.

The effect of sodium sulfate in decreasing the solubility of calcium sulfate in saturated sodium chloride brine at various temperatures is given quantitatively in Fig. 1. The data there presented, which were determined by careful physico-chemical techniques, are largely new to the literature. Reference to Fig. 1 will indicate the precise amount of sodium sulfate necessary for any particular combination of temperature and calcium sulfate concentration which may be desired in cell operation.

Within the limits of pH and calcium sulfate concentration previously given, the quantitative interrelation of these variables to the hydrogen content of the chlorine produced in a mercury-cathode cell is dependent on temperature and current density, and to a lesser extent also on cell operation and design. It is best determined for any given installation by empirical testing.

Figure 2:
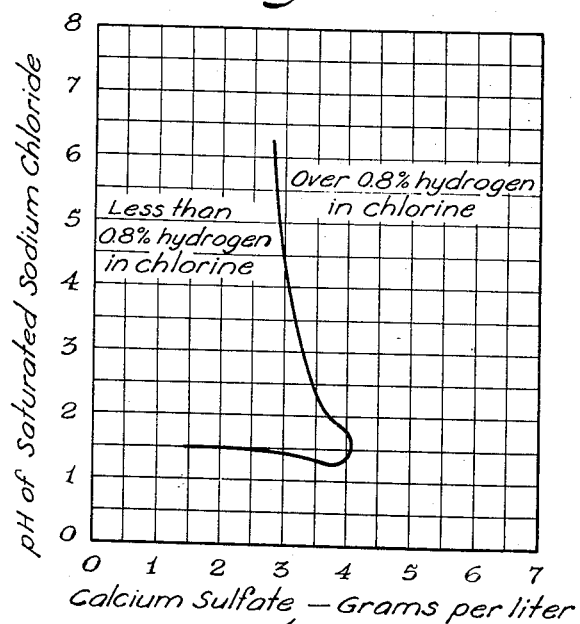
Fig. 2 is a graph showing the interrelation of the limiting values of the pH and the calcium sulfate content of a saturated sodium chloride brine permissible in producing chlorine gas containing less than 0.8 percent hydrogen by electrolysis of the brine in a mercury-cathode cell.

Fig. 2 represents a typical interrelation determined on a full-size commercial mercury-cathode cell of the type described in Chem. Eng. 52 (10), 104–112 (October 1945). The operating temperature was 75° to 80° C., the cathode current density about 1.7 amperes per square inch, the brine flow rate such that the effluent anolyte contained about 270 grams per liter of sodium chloride, and the mercury flow rate adjusted to an outlet concentration of about 0.08 percent sodium. The curve of Fig.

2 shows the pH and calcium sulfate concentration (the latter controlled by sodium sulfate) corresponding to 0.8 percent hydrogen in the evolved chlorine. At values of pH and calcium sulfate concentration above and to the left of the curve less than 0.8 percent hydrogen is encountered while below and to the right more than that amount is produced. Similar curves can be drawn for other hydrogen tolerances, e.g. 0.5 percent or 1.0 percent, and approximately parallel the 0.8 percent curve shown. For example, at pH 4 and calcium sulfate 4.0 grams per liter, the hydrogen content is about 1.0 percent. Since temperature and cell operation affect the position of the curves only moderately, Fig. 2 may be used for rough choice of conditions in any mercury-cathode cell installation.

While, in operating within the limiting pH and calcium sulfate values according to the invention, a far higher tolerance for iron in the feed brine is realized without encountering excessive hydrogen deposition and cell operation is more stabilized than in prior practice, it is not intended to imply that all precautions heretofore followed in purifying the feed brine may be abandoned. As in prior practice, magnesium should preferably be present as less than 0.01 gram per liter, better less than 0.002 gram per liter, and the brine should also be substantially free of heavy metals and of anions other than chloride and sulfate. The tolerance for iron, instead of being almost impossibly low, is of the order of 0.01 to 0.02 gram per liter; in general higher amounts should be avoided. Magnesium, the heavy metals, and iron are easily excluded to below these values simply by alkalizing the brine and separating it from the resulting precipitate, as in known brine purifications.

Figure 3:
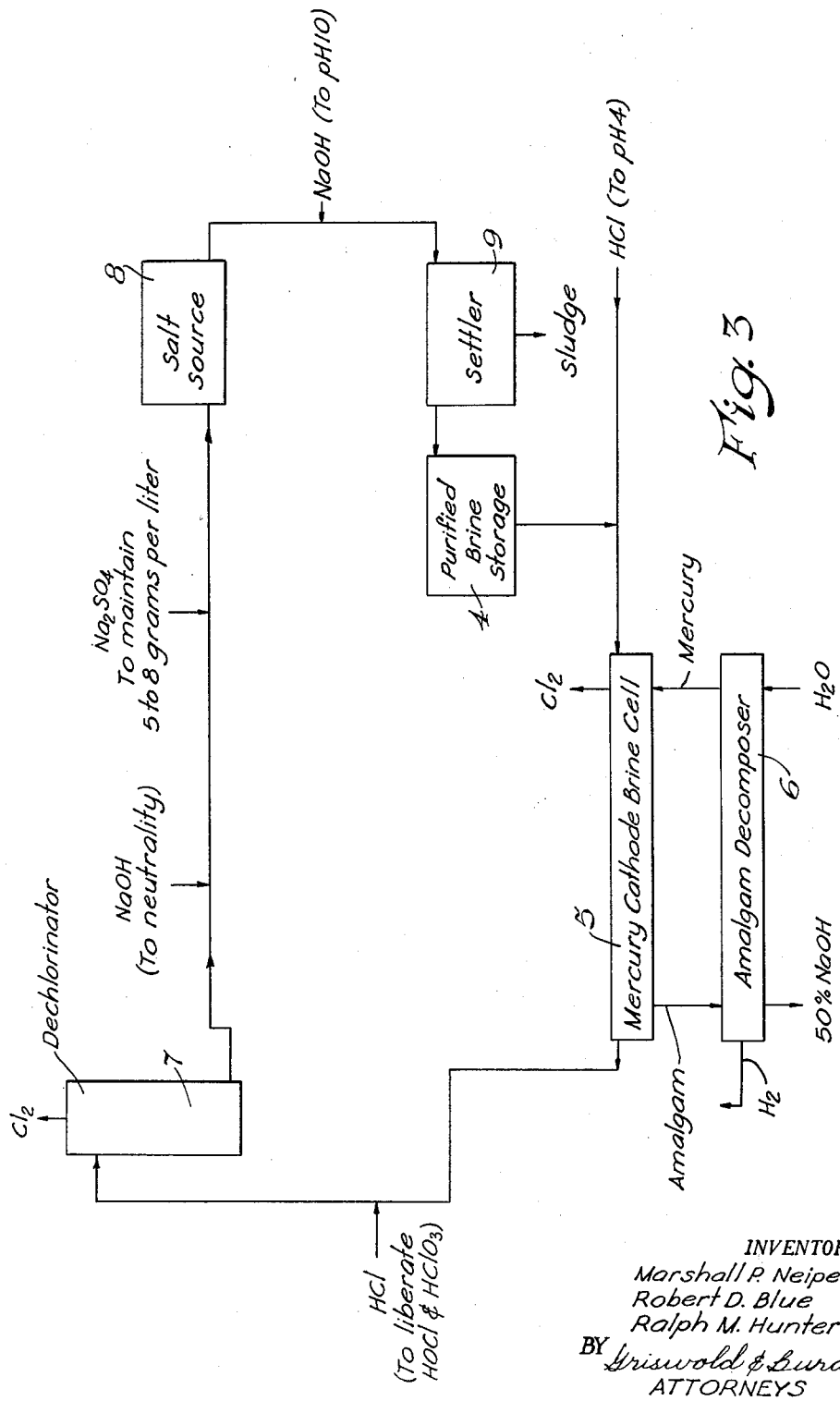
Fig. 3 is a schematic flowsheet illustrating a preferred brine treatment according to the invention.

A preferred way of carrying out the process of the invention is illustrated diagrammatically in Fig. 3. As there shown, saturated sodium chloride brine saturated with calcium sulfate, purified to the degree indicated above and containing 5 to 8 grams per liter of sodium sulfate (corresponding to a calcium sulfate concentration of about 3 grams per liter) is maintained in a storage tank 4. In operation, this brine is continuously removed from the tank 4 as a stream and acidified with dilute hydrochloric acid to a pH value of 4, the addition being controlled by automatic instruments. The acid brine is then passed through a mercury-cathode brine cell 5 at a temperature of 40° to 100° C., chlorine being recovered at the anodes and sodium amalgam being formed at the cathode. The amalgam passes continuously to a decomposer 6 in which it is treated with water while in contact with graphite grids to generate strong sodium hydroxide solution, also liberating hydrogen and regenerating the mercury for recirculation to the cell. The partially electrolyzed brine, depleted in sodium chloride, is continuously withdrawn from the cell, resaturated with sodium chloride, purified, and returned to storage 4.

In this resaturation cycle, the brine is first treated with hydrochloric acid in an amount just sufficient to convert to chlorine any hypochlorite or chlorate impurities produced in the cell. It is then passed through a dechlorinating tower 7 under reduced pressure, or blown with air, to remove dissolved chlorine. It may be further dechlorinated, if necessary, by passage through a bed of charcoal, not shown. The chlorine-free brine is next neutralized with dilute sodium hydroxide solution to prevent corrosion of subsequent equipment. Sodium sulfate is then introduced as needed into the neutral brine in a proportion sufficient to maintain a concentration of 5 to 8 grams per liter. Inasmuch as the recirculating brine already contains sodium sulfate added in previous cycles, only make-up quantities are required.

Following adjustment of the sodium sulfate content, the brine is then passed into contact with a source 8 of raw sodium chloride for a time sufficient to resaturate it. The resaturation may be carried out in a conventional dissolver using rock salt or the brine may be pumped down wells into a natural salt deposit and later recovered. Since most raw salt contains calcium sulfate (gypsum), the resaturated brine is usually nearly or entirely saturated with this substance, depending on the time of contact. However, the concentration of sodium sulfate is sufficient to depress the solubility of calcium sulfate to within the operating range according to the invention. After resaturation, the brine is purified in conventional manner by alkalizing it to a pH value of 9 to 10.5 with sodium hydroxide. Heavy metal impurities, magnesium, and iron precipitate as hydroxides and are removed from the alkaline brine, as by filtration or in a settler 9. The purified brine is then returned to storage.

In the process of Fig. 3, no difficulty is ordinarily encountered in maintaining the required balance of concentration of sodium sulfate and calcium sulfate in the brine. However, if the concentration of calcium should show a tendency to build up, it may usually be lowered by increasing the sodium sulfate concentration. It is also possible to reduce the calcium content by adding sodium carbonate to the brine at the time it is alkalized to precipitate impurities. If the concentration of sulfate ion should show any sign of exceeding 10 grams per liter, it is easily lowered by discarding a part of the recycled brine, or by adding barium chloride to the brine at the time of purification.

While the presence of sodium sulfate in the recycling brine is employed in the process of Fig. 3 to repress calcium sulfate solubility, it is not essential that the sodium sulfate be added as such to the brine. The required concentration may be developed in some other way. For example, if the purified brine going to the cell is acidified with sulfuric acid rather than hydrochloric, sodium sulfate will be produced when the brine is neutralized after dechlorination. Likewise, if sodium carbonate is added to the brine to lower the calcium content, some sodium sulfate is formed.

The following example will further explain the invention:

The process illustrated in Fig. 3 was operated on a sodium chloride brine containing 6.5 grams per liter of sodium sulfate. After resaturation with raw sodium chloride containing gypsum, the brine contained 2.58 grams per liter of calcium sulfate, being thus slightly less than saturated with the latter. After alkalization and separation from the hydroxide precipitate, the brine contained 0.001 gram per liter of magnesium and 0.0008 gram per liter of iron. When this brine was acidified to a pH of about 5.0 and was electrolyzed in a mercury-cathode chlorine cell under the conditions described with respect to Fig. 2, the chlorine produced contained about 0.48 percent hydrogen.

What is claimed is:

1. In the electrolysis in a mercury cathode electrolytic cell at a temperature of 40° to 100° C. of a substantially saturated sodium chloride brine substantially saturated with calcium sulfate and containing less than 0.01 gram per liter of magnesium and from 0.1 part per million to 0.01 gram per liter of iron, the improvement which comprises circulating the said brine through the cell while maintaining hydrochloric acid dissolved in the circulating brine entering the cell in a proportion to produce a pH value from 2 to 4.5 and adding to the brine sodium sulfate in such proportion as to maintain both sodium sulfate and total sulfate ion in concentrations less than 10 grams per liter but sufficient to repress the solubility of the calcium sulfate to not more than 3 grams per liter.

2. A process according to claim 1 wherein the pH value is from 3.5 to 4.5 and wherein the concentration of sodium sulfate is from 5 to 8 grams per liter.

3. In the electrolysis of a saturated sodium chloride brine in a mercury-cathode electrolytic cell wherein the brine is circulated through the cell and the discharged brine is dechlorinated, resaturated by contact with sodium chloride containing gypsum, alkalized to precipitate heavy-metal impurities and magnesium, separated from any precipitate, and returned to the cell, the improvements which comprise adding to the brine sodium sulfate in such proportion as to maintain sodium sulfate dissolved in the brine in a proportion sufficient to repress the solubility of gypsum in the saturated brine to not more than 3 grams per liter but insufficient to produce concentrations of total sulfate ion and of sodium sulfate over 10 grams per liter and maintaining an acidity corresponding to a pH value between 2 and 4.5 in the brine as it is returned to the cell.

4. In the electrolysis of a strong sodium chloride brine in a mercury-cathode electrolytic cell wherein the brine is circulated through the cell and the discharged brine is re-saturated by contact with sodium chloride containing calcium sulfate, alkalized to precipitate heavy metal impurities and magnesium, separated from any precipitate, and returned to the cell, the improvements which comprise adding to the brine sodium sulfate in such proportion as to maintain sodium sulfate dissolved in the brine in a proportion sufficient to repress the solubility of calcium sulfate in the brine to below 4 grams per liter but insufficient to produce a total sulfate ion concentration over 10 grams per liter and maintaining an acidity corresponding to a pH value between 1.5 and 4.5 in the brine as it is returned to the cell.

5. A process according to claim 4 wherein the pH and calcium sulfate concentration in the brine are maintained at values above and to the left of the curve shown on the graph in Fig. 2 of the drawing, the concentration of calcium sulfate being at least about 1.5 grams per liter and the pH value being no more than about 4.5.

References Cited in the file of this patent

UNITED STATES PATENTS

| | | |
|---|---|---|
| 583,330 | Sueur | May 25, 1897 |
| 642,023 | Vis | Jan. 23, 1900 |
| 814,692 | Harmon | Mar. 13, 1906 |
| 1,003,041 | Ekstrom | Sept. 12, 1911 |
| 1,259,683 | Van Hasselt | Mar. 19, 1918 |
| 2,248,137 | Taylor et al. | July 8, 1941 |

FOREIGN PATENTS

| | | |
|---|---|---|
| 217,414 | Great Britain | June 19, 1924 |

OTHER REFERENCES

Transactions of American Electrochemical Society, vol. 3, 1903, pp. 185–194 (an article by Walker etc.).

Chemical and Metallurgical Engineering, vol. 52, pp. 104, 105, 106, 112 (October 1945).

Principles and Applications of Electrochemistry, vol. II by W. A. Koehler, 2nd ed., 1944, John Wiley & Sons, New York, pp. 292, 293, 294, 313, 314, 315.

"Inorganic Chemistry," by Jones (August 1947), pp. 295 and 296.

UNITED STATES PATENT OFFICE

CERTIFICATION OF CORRECTION

Patent No. 2,949,412　　　　　　　　　　　　　　August 16, 1960

Marshall P. Neipert et al.

It is hereby certified that error appears in the above numbered patent requiring correction and that the said Letters Patent should read as corrected below.

Column 6, line 14, list of references cited, under "UNITED STATES PATENTS", add the following:
　　　　2,787,591　　　　Gardiner et al. ----Apr. 2, 1957

Signed and sealed this 9th day of May 1961.

(SEAL)
Attest:

ERNEST W. SWIDER
Attesting Officer

DAVID L. LADD
Commissioner of Patents